United States Patent [19]
Stogner

[11] Patent Number: 5,993,216
[45] Date of Patent: Nov. 30, 1999

[54] MULTI-FUNCTIONAL ENCLOSURE

[76] Inventor: Robert B. Stogner, 1000 Payne St., Murray, Ky. 42071-1956

[21] Appl. No.: 08/938,713

[22] Filed: Sep. 26, 1997

[51] Int. Cl.⁶ .................................................. A63C 31/16
[52] U.S. Cl. ............................... 434/29; 434/43; 434/69; 434/307 R; 434/365; 472/130; 52/36.2; 312/223.2; 340/825.31
[58] Field of Search ..................................... 361/683, 724, 361/726; 312/223.3, 235.5, 235.9, 240; 52/36.2, 36.1, 79.1, 27; 434/29, 32, 34, 38, 43–45, 55, 62, 69, 237, 238, 258, 259, 260, 307 R, 308, 365; 472/130, 131, 135; 340/825.31, 825.33, 825.34

[56] References Cited

U.S. PATENT DOCUMENTS

| | | |
|---|---|---|
| 3,233,346 | 2/1966 | Cornberg ............................. 434/307 R |
| 3,770,334 | 11/1973 | Weber . |
| 4,164,080 | 8/1979 | Kosydar et al. .......................... 434/38 |
| 4,378,727 | 4/1983 | Doss . |
| 4,486,180 | 12/1984 | Riley ......................................... 434/65 |
| 4,487,410 | 12/1984 | Sassak .................................. 434/55 X |
| 4,527,980 | 7/1985 | Miller ................................. 472/130 X |
| 4,710,128 | 12/1987 | Wachsmuth et al. ..................... 434/46 |
| 4,767,334 | 8/1988 | Thorne et al. ............................. 434/29 |
| 4,784,445 | 11/1988 | Ott . |
| 4,856,771 | 8/1989 | Nelson et al. ......................... 434/45 X |
| 4,974,915 | 12/1990 | Bussard . |
| 5,052,932 | 10/1991 | Trani ......................................... 434/29 |
| 5,327,744 | 7/1994 | Frawley et al. . |
| 5,364,270 | 11/1994 | Aoyama et al. .......................... 434/55 |
| 5,376,007 | 12/1994 | Zirm . |
| 5,388,990 | 2/1995 | Beckman .................................. 434/38 |
| 5,388,991 | 2/1995 | Morris ....................................... 434/55 |
| 5,409,307 | 4/1995 | Forsythe . |
| 5,490,784 | 2/1996 | Carmein .............................. 434/365 X |
| 5,573,320 | 11/1996 | Shearer . |
| 5,638,646 | 6/1997 | Shane ................................... 52/36.2 X |
| 5,746,599 | 5/1998 | Lechner ..................................... 434/44 |
| 5,860,811 | 1/1999 | Henderson ............................ 434/55 X |
| 5,888,074 | 3/1999 | Staplin et al. .................. 434/307 R X |

FOREIGN PATENT DOCUMENTS

| | | |
|---|---|---|
| 4-231239 | 8/1992 | Japan . |
| 4-269907 | 9/1992 | Japan . |

*Primary Examiner*—Joe H. Cheng
*Attorney, Agent, or Firm*—Richard C. Litman

[57] ABSTRACT

A fixed or portable multi-functional enclosure that is card-operated, climate controlled, and provides a quiet work place for use by students or businessmen. The enclosure has a generally semi-oval shaped housing comprising a front portion including a front cowling, a central portion with a curved door, and a rear portion with a lower section and a rear lid. The enclosure housing includes three magnetic card readers located on the opaque front cowling, the curved door, and the rear lid. The central portion includes an ergonomically designed seat or chair and a curved console containing a computer monitor. The ergonomically designed seat or chair is tiltable and is dimensionally adjustable up, down, forward, and backward. The console includes a fiber optic camera, a computer monitor, a computer printer, a modem, a facsimile machine, and a phone speaker. Positioned on the console are connection ports for a VOX head phone set and a virtual reality head set. The console also includes two floppy disc drives, one back-up tape drive, and a digital clock displaying day, date, and time. Housed beneath the monitor is a split computer keyboard and a small special function keypad that pulls forward to sit in front of each arm rest and is dimensionally adjustable for typing comfort. The central portion also includes a panel with controls for heat, air, and lights.

19 Claims, 5 Drawing Sheets

MULTI-FUNCTIONAL ENCLOSURE

BACKGROUND OF THE INVENTION

1. Field of the Invention

The present invention relates generally to educational or commercial work environments, and more specifically, to a fixed or portable multi-functional enclosure that is card-operated, climate controlled, and provides a quiet work place for use by students or businessmen.

2. Description of Related Art

Educational teaching techniques and learning environments have changed very little since the early days of our country. The bedrock of education remains the teacher or professor lecturing to groups of students, commonly in conjunction with a text. Homework is assigned to reinforce the lessons learned in class and tests are administered to measure students' aptitude and retention of material. At the early levels of education, the setting for this instruction has and continues to be the schoolroom, public or private, where a teacher is responsible for a group of, for example, fifteen to forty students. Educators have long recognized that while the classroom scenario provides economies of scale, one drawback is that students of different ages and aptitudes learn at differing rates and with the need for varying amounts of individual attention.

In addition to educational environments it is noted that some of the most important services that can be provided to a frequent business traveler while away from the office are those that are telecommunications related. Many services required by such business travelers are not conveniently accessible to them. Most business travelers are currently restricted to limited telecommunications services offered through pay phone facilities when waiting at airports or during breaks at convention centers and conferences. Therefore, there is a need to enhance the conventional educational environment to provide more flexibility to meet an individual student's needs. In addition, there is a need to provide a convenient work environment for business travelers that provides access to services to facilitate the conducting or completing of business while away from the office.

U.S. Pat. No. 3,770,334, issued on Nov. 6, 1973 to Reinold Weber, discloses a combination desk and chair. Weber does not suggest the multi-functional enclosure according to the claimed invention.

U.S. Pat. No. 4,378,727, issued on Apr. 5, 1983 to James A. Doss discloses an open space office system including a central ventilation means. Doss does not suggest the multi-functional enclosure according to the claimed invention.

U.S. Pat. No. 4,784,445, issued on Nov. 15, 1988 to Donald E. Ott discloses a heated and ventilated work station. Ott does not suggest the multi-functional enclosure according to the claimed invention.

U.S. Pat. No. 4,974,915, issued on Dec. 4, 1990 to Janice W. Bussard discloses a modular work station. Bussard does not suggest the multi-functional enclosure according to the claimed invention.

U.S. Pat. No. 5,327,744, issued on Jul. 12, 1994 to Robert C. Frawley et al. discloses an integrated environmental control system for a helicopter. Frawley et al. do not suggest the multi-functional enclosure according to the claimed invention.

U.S. Pat. No. 5,376,007, issued on Dec. 27, 1994 to Matthias Zirm discloses a microsurgical operation teaching arrangement including the use of audio-visual means and two-way communication between the teacher and the students. Zirm does not suggest the multi-functional enclosure according to the claimed invention.

U.S. Pat. No. 5,409,307, issued on Apr. 25, 1995 to Lester W. Forsythe discloses a desk which can function as both a computer desk for supporting a computer and a vehicle simulator cockpit for use with vehicle simulator software programs operated on the computer with associated user interface devices. Forsythe does not suggest the multi-functional enclosure according to the claimed invention.

U.S. Pat. No. 5,573,320, issued on Nov. 12 1996 to Brian R. Shearer discloses an enclosure for a video game or computer system and the system user. Shearer does not suggest the multi-functional enclosure according to the claimed invention.

Japan Patent document number 4-2312, published on Aug. 20, 1992, discloses a bench integrally connected between two service units at a service station to protect service station employees from the heat and cold. Japan '312 does not suggest the multi-functional enclosure according to the claimed invention.

Japan Patent document number 4-269907, published on Sep. 25, 1992, discloses a desk provided with an air conditioner. Japan '907 does not suggest the multi-functional enclosure according to the claimed invention.

None of the above inventions and patents, taken either singly or in combination, is seen to describe the instant invention as claimed.

SUMMARY OF THE INVENTION

The present invention is a fixed or portable multi-functional enclosure that is card-operated, climate controlled, and provides a quiet work place for use by students or businessmen. The enclosure has a generally semi-oval shaped housing comprising a front portion with an opaque front cowling, a central portion with a curved door having a lower opaque section and an upper transparent section, and a rear portion with an opaque lower section and an opaque rear lid. The housing includes three magnetic card readers located on the opaque front cowling, the curved door, and the opaque lid. The multi-functional enclosure is approximately eight and one half feet long, three and one half feet wide, and five feet nine inches to six feet tall at the center. All outside surfaces are curved with the exception of the front end which is flat. The bottom is flat so that it may be anchored securely to the floor. The enclosure may be constructed of any of a variety of sturdy materials, preferably opaque, high-impact plastic and clear plexiglass.

At the front of the multi-functional enclosure is a front storage area under the opaque front cowling of sufficient size to provide adequate and secure space for computer hardware (CPU, RAM, etc.). The front cowling includes a magnetic card reader and a handle.

In the center of the multi-functional enclosure is a main operational area. Access to the main operational area is provided by a curved door having a lower opaque section and an upper transparent section. The curved door includes a handle and a magnetic card reader. The main operational area includes an ergonomically designed seat or chair and a curved console containing a computer monitor which is tiltably adjustable from approximately twenty-five to forty-five degrees upward to facilitate personal viewing comfort. The main operational area also includes a panel with controls for heat, air, and lights. The ergonomically designed seat or chair is tiltable and dimensionally adjustable up, down, forward, and backward.

The seat includes arm rests that articulate so they may be adjusted in a similar manner to the seat. Each arm rest is concaved to allow a forearm to be cradled in a natural position. At the forward end of each arm rest is a palm shaped disc approximately two inches thick. Each disc is either integrally mounted into an arm rest or is, alternatively, seated on top of a rod which connects beneath the arm rest to the seat. The disc and supporting rod can recess into the under side of each arm rest. Each disc has five shallow grooves that correspond to the digits of each hand. At the end of each groove is a computer function button. These discs are moveable left to right, up and down, and will serve as, and replace, the "mouse" control normally used to operate a computer. The upper rear portion of the seat at head level may have "wings" extending on either side of the seat approximately eight inches housing stereophonic speakers with the volume control for the same being located as one of the function buttons on the palm discs. Alternatively, speakers may only be mounted on the console or may be mounted both on the console and in the seat.

The console includes a fiber optic camera, a computer monitor, a computer printer, a modem, a facsimile machine, and a phone speaker. Positioned conveniently on the console are connection ports for a VOX head phone set and a virtual reality head set. The console also includes two floppy disc drives, one back-up tape drive, and a digital clock displaying day, date, and time. Visible schedule lights may also be included for alerting users to ready themselves for break periods, such as lunch, recess, special events, etc. Housed beneath the monitor is a split computer keyboard and a small special function keypad that pulls forward to sit in front of each arm rest and is dimensionally adjustable for typing comfort. The keys on the keyboard may include braille to accommodate use by the blind.

Behind the seat is a solid plastic wall that separates the main operational area from a storage area structured above a utility area. A floor separates the utility area from the storage area. The utility area contains heating, air conditioning and/or circulating, and lighting equipment. Electrical connection ports for providing operating current are also included in the utility area. The utility area also contains a smoke detecting device and alarm. The controls are located on a panel in the main operational area in the opaque inside right of the plexiglass top. Above and separated from the utility area is a storage area of approximately three to four cubic feet. The storage area includes an opaque split lid and provides users a safe place to store personal belongings. The enclosure may be used for either educational or commercial purposes. The educational benefits of the enclosure include the ability to provide more flexibility to meet an individual student's needs. The commercial use of the enclosure in both the public and private sectors of our society can supply all communication requirements to conduct any and all manner of commercial activity needs.

Accordingly, it is a principal object of the invention to provide a multi-functional enclosure that is card-operated, climate controlled, and provides a quiet work place for use by students or businessmen.

It is another object of the invention to provide a multi-functional enclosure that can be used for educational or commercial purposes.

It is a further object of the invention to provide a multi-functional enclosure that can be adapted to facilitate access by handicapped or disabled people.

It is an object of the invention to provide improved elements and arrangements thereof in a multi-functional enclosure for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
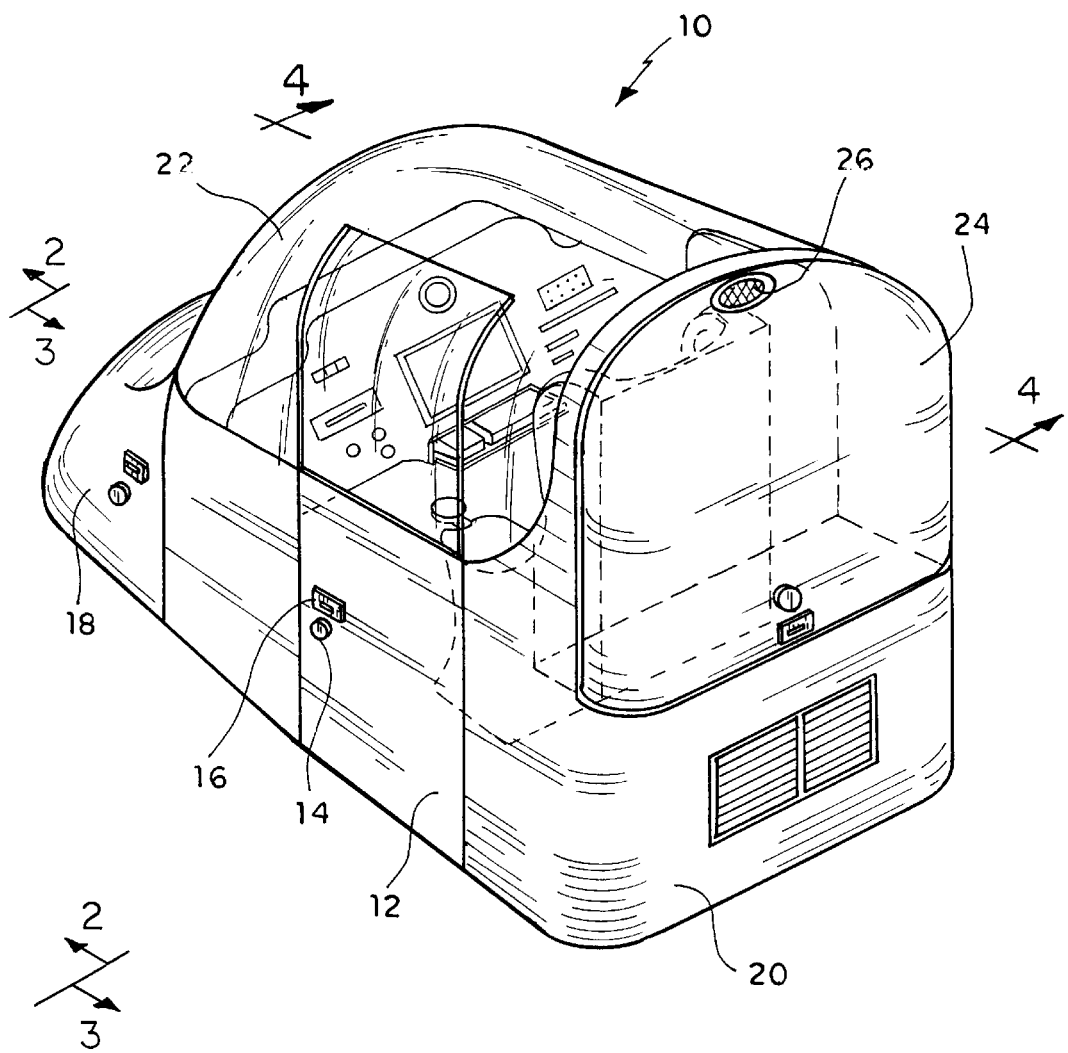
FIG. 1 is rear perspective view of a multi-functional enclosure according to the invention.
Figure 2:
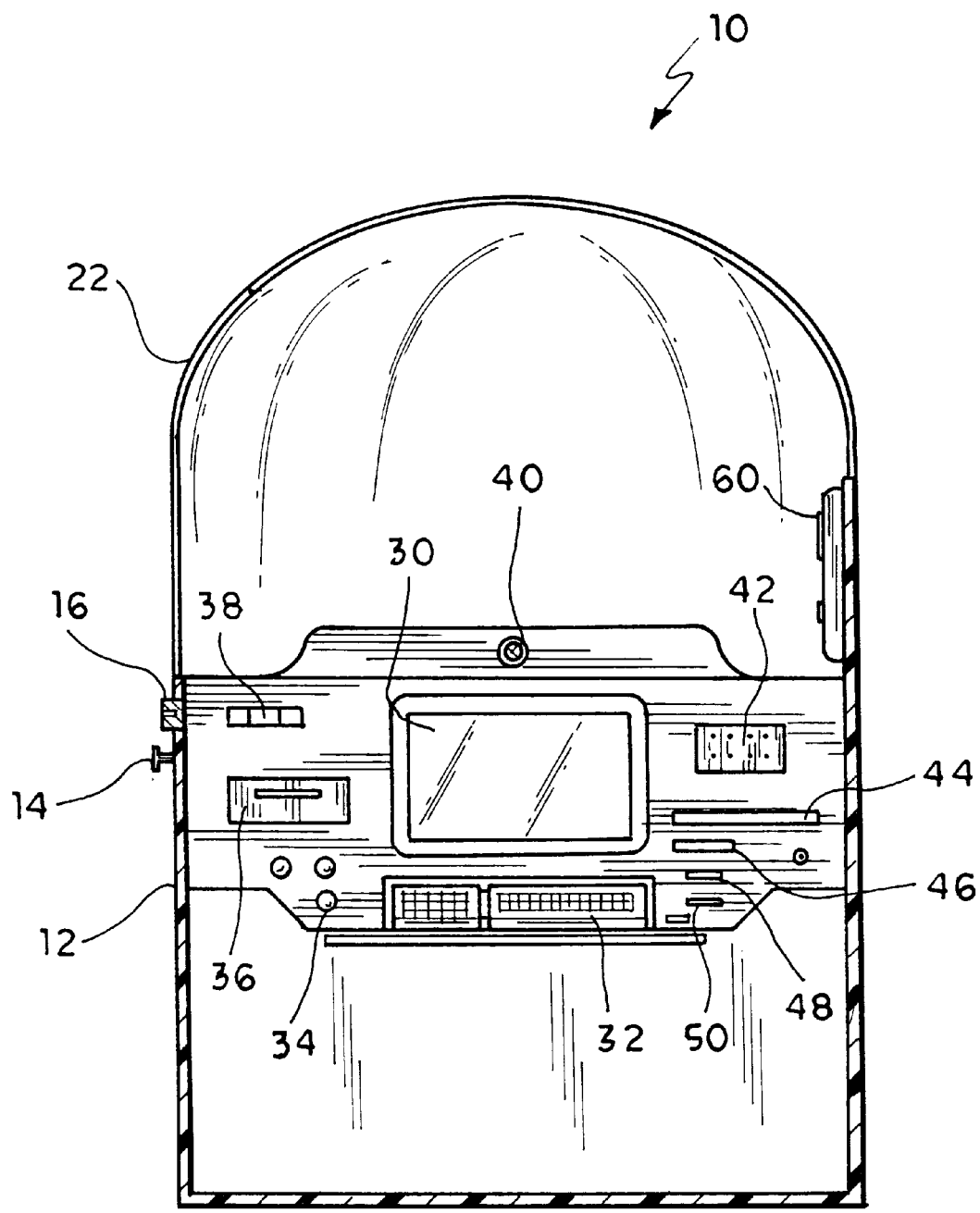
FIG. 2 is a front section view drawn along lines 2—2 of FIG. 1.

Referring now to the drawings, there is a fixed or portable multi-functional enclosure 10 that is card-operated, climate controlled, and provides a quiet work place for use by students or businessmen. The enclosure 10 has a generally semi-oval shaped housing comprising a front portion with an opaque front cowling 18, a central portion with a curved door 12 having a lower opaque section and an upper transparent section, and a rear portion with an opaque lower section 20 and an opaque lid 24. The housing includes three magnetic card readers located on the opaque front cowling 18, the curved door 12, and the opaque lid 24.

The multi-functional enclosure 10 is approximately eight and one half feet long, three and one half feet wide, and five feet nine inches to six feet tall at the center. All outside surfaces are curved with the exception of the front end which is flat. The bottom is flat so that it may be anchored securely to the floor. While the enclosure 10 may be constructed of any of a variety of sturdy materials, it is preferably made of a lower portion of opaque, high-impact plastic and an upper portion of clear plexiglass.

At the front portion of the multi-functional enclosure 10 is a front storage area under front cowling 18 of sufficient size to provide adequate and secure space for computer hardware (CPU, RAM, etc.). The front cowling 18 includes a magnetic card reader and a handle.

In the central portion of the multi-functional enclosure 10 is a main operational area. Access to the main operational area is provided by curved door 12 having a lower opaque section and an upper transparent section. The lower opaque section may be covered with an acoustical rubberized coating to provide sound insulation. The curved door includes a handle 14 and a magnetic card reader 16. The main operational area includes an ergonomically designed seat or chair 70 and a curved console containing a computer monitor 30 which is tiltably adjustable approximately twenty to forty-five degrees upward to facilitate personal viewing comfort. The main operational area also includes a panel 60 with controls for heat, air, and lights. The ergonomically designed seat or chair 70 includes means to enable it to be tiltable and dimensionally adjustable up, down, forward, and backward.

Figure 3:
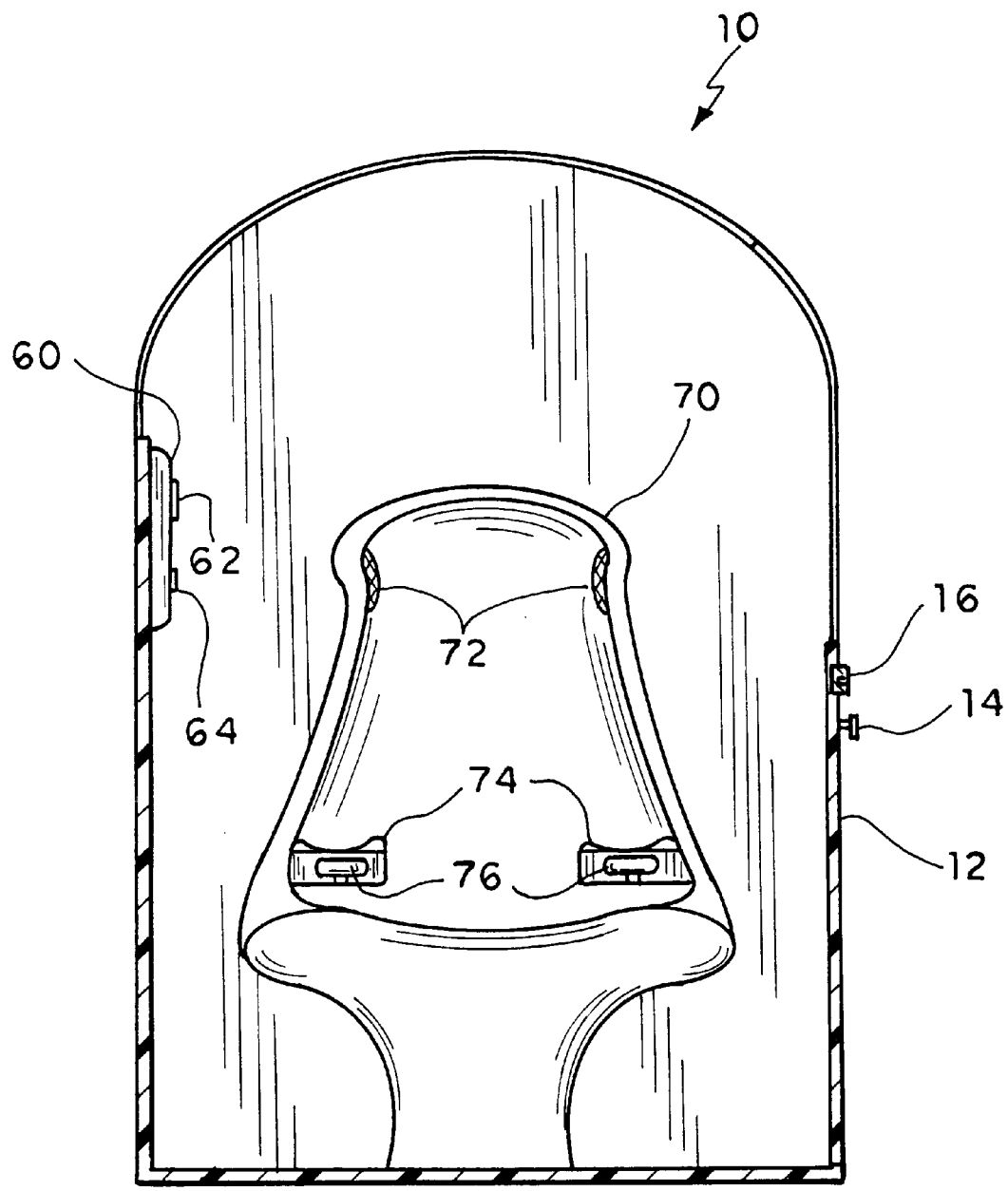
FIG. 3 is a rear section view drawn along lines 3—3 of FIGS. 1.
Figure 4:
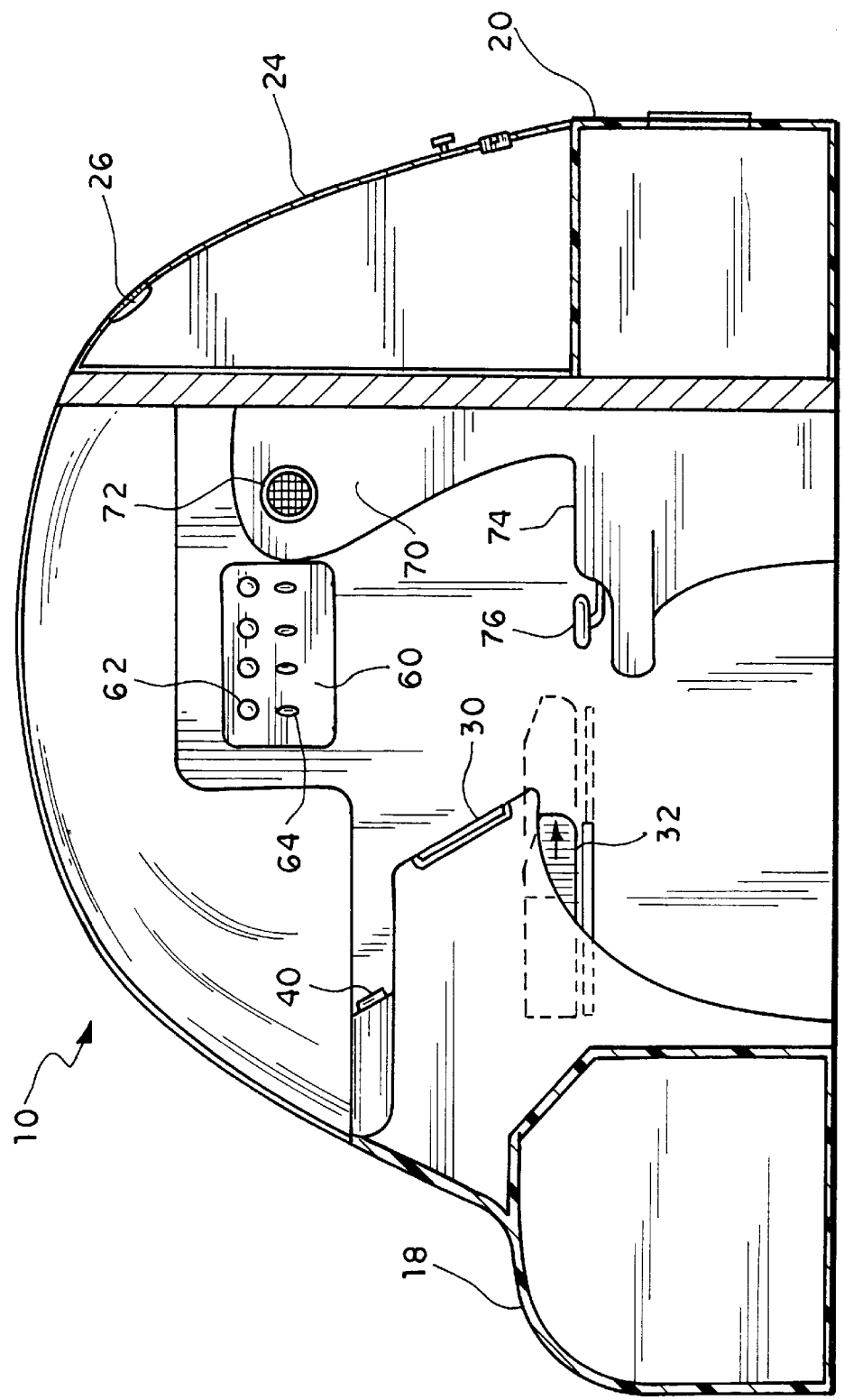
FIG. 4 is a side section view drawn along lines 4—4 of FIG. 1.

As shown in FIGS. 3 and 4, the seat 70 includes arm rests 74 that articulate so they may be adjusted in a similar manner to the seat 70. Each arm rest 74 is concaved to allow a forearm to be cradled in a natural position. At the forward end of each arm rest 74 is a palm shaped disc 76 approximately two inches thick. Each disc is either integrally mounted into an arm rest 74 or is, alternatively, seated on top of a rod which connects beneath the arm rest 74 to the seat 70. The disc 76 and supporting rod can recess into the under side of each arm rest 74. Each disc 76 has five shallow grooves that correspond to the digits of each hand. At the end of each groove is a computer function button. These discs 76 are moveable left to right, up and down, and will serve as, and replace, the "mouse" control normally used to operate a computer. The upper rear portion of the seat 70 at head level has "wings" extending on either side of the seat 70 approximately eight inches housing stereophonic speakers 72 with the volume control for the same being located as one of the function buttons on the palm discs 76. Alternatively, speakers may only be mounted on the console or may be mounted both on the console and in the seat.

The console includes a fiber optic camera 40, a computer monitor 30, a computer printer 44, a modem, a facsimile machine 36, and a phone speaker. Positioned conveniently on the console are connection ports for a VOX head phone set, a virtual reality head set, and a laptop computer. The console includes a special function keypad having a number of keys that enables a user to carry out preprogrammed functions at the touch of a button, such as setting up appointments to see a teacher, a principle, a nurse, etc. Below the special function keypad are digital camera ports for connection with digital cameras. The console may also include a cursive electronic writing pad and an electronic writing tool enabling a user to enter cursive writing samples which could be compared with stored curseve models. The console also includes two floppy disc drives 48,50, one back-up tape drive 46, and a digital clock 38 displaying day, date, and time.

Visible schedule lights 34 may be included for alerting users to ready themselves for break periods, such as lunch, recess, special events, etc. The monitor 30 can be a conventional VGA monitor attached via a serial port to a system bus. In some preferred embodiments of the invention, the monitor 30 may be touch sensitive so that a user can enter data and respond to questions from the computer via the screen. Housed beneath the monitor 30 is a split computer keyboard 32 and a small special function keypad that pulls forward to sit in front of each arm rest and is dimensionally adjustable for typing comfort. An alphanumeric keypad providing calculator capabilities may also be included to the right of the keyboard 32. The keys on the keyboard 32 may include braille and the console may include an adjustable speed braille pin reader to accommodate use by the blind.

Beneath the keyboard 32 is a pullout desktop as a provision for a laptop computer. The computer in the enclosure 10 includes a laptop computer function that enables a user to upload and download data from the laptop to the computer once the laptop is properly connected to the laptop connection port. The function keys on the palm discs 76 and the split keyboard 32 operate all related equipment contained within the main operational area with the exception of heat, air, and lights. The main operational area may also contain passive, noninvasive monitors to record ambient temperature, heart rate, body temperature, breathing rate and stress levels of the users. These monitors can operate constantly or at periodic intervals. Stress can be measured by voice graph analysis. The computer in the enclosure is fully internet ready. Interconnection of the electronic components is not discussed in greater detail since the interconnection of components in a microcomputer system is well known in the prior art. It is understood that other equipment could be substituted without departing from the scope of the invention.

Behind the seat 70 is a solid plastic wall that separates the main operational area from a storage area structured above a utility area. A floor separates the utility area from the storage area. The utility area contains heating, air conditioning/circulating, and lighting equipment. The utility area also contains a smoke detecting device and alarm. Electrical connection ports for providing operating current are included in the utility area. The controls are located on a panel 60 in the main operational area in the opaque inside right of the plexiglass top. Above and separated from the utility area is a storage area of approximately three to four cubic feet. The storage area includes an opaque split lid 24 and provides users a safe place to store personal belongings.

The outside of the multi-functional enclosure 10 contains three magnetic card ports 16: one on the opaque front cowling 18 for access to the front storage area for computer hardware, one on the curved door 12 for access to the main operational area and one on the door 24 for access to the storage/utility area. Access to the multi-functional enclosure 10 is controlled by a card-operated controlled lock, which is responsive to magnetic characters imprinted on a card, or by a special key. The card is read by a computer, coupled to the multi-functional enclosure 10, which records the data on the card, such as the user name, identification data, and the time the card is inserted in the lock, etc.

Figure 5:
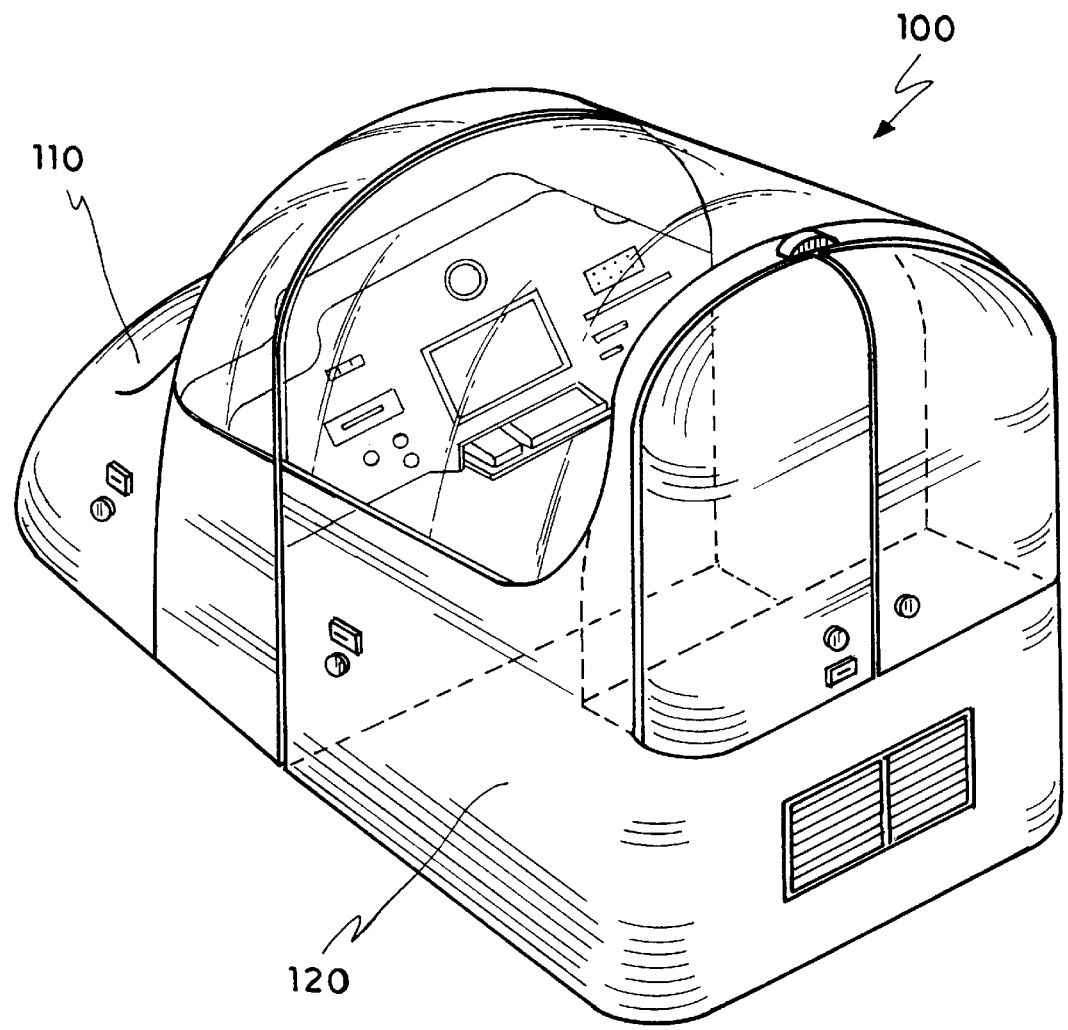
FIG. 5 is rear perspective view of a multi-functional enclosure according to the invention.

If the computer determines that the user is entitled to access, it activates the door lock to release the door 12 to allow entrance of the user into the enclosure 10, and activates light and climate control equipment for heating and air conditioning. The inside of the door 12 has redundant electronic and manual opening devices to prevent entrapment. A safety light 26 is located on the top back of the enclosure 10. The enclosure 10 is easily adaptable for persons with physical disabilities. For example, as shown in FIG. 5, the enclosure 100 could be configured in the form of a front portion 110 and a rear portion 120 having no door and no interior seat to provide access by users in wheelchairs. The rear portion 120 could be adapted to separate from the front portion along rails.

The enclosure 10 may be used for either educational or commercial purposes. The educational benefits of the enclosure 10 include the ability to provide more flexibility to meet an individual student's needs. A classroom containing enclosures 10 for each student could be in constant communication with a teacher's workstation via a local area network (LAN). This real-time communication between student workstation and teacher workstation would allow the teacher to be informed of the students' progress as well as allowing the teacher to tailor instructional programs for each student.

The teacher and/or system program could then use the results of homework assignments in conjunction with each student's progress, which has been stored in another database file at the end of the previous day, to assign lesson segments to each student as the process allows the teacher and/or a system program to determine how much and what type of material each student can access for a given period of time, and provide the first of several opportunities for the teacher and/or system program to tailor each student's individual learning program.

Within the system the assignment process could be controlled by the CPU of the teacher's station which would download the control programs corresponding to the lesson segments selected by the teacher and/or system program from the hard drive or other storage device of the teacher's workstation to the selected student's station through the LAN. Alternately, a single control program could be downloaded to the students' workstation. When run by the student these control programs could access various information storage devices to retrieve the audio and visual data created for each lesson segment.

Typically, a series of questions would be retrieved from a database of questions associated with the particular lesson segment for the student to answer. The student would enter responses via the keyboard, and the workstation CPU would compare these responses to the correct answers stored in the database. If desired, a grade on the student's responses could be generated and transmitted to the teacher's station for storage in the student's file.

If the student had correctly answered all of the questions the student could access another lesson segment, request recreational material, or end for the day. If the student had incorrectly answered some questions, the program could retrieve and replay only material relating to those questions which were missed. This replayed material could be excerpted from the original presentation or it could be new material specifically designed to explain the correct answer to each incorrectly answered question.

After replaying this remedial material, the same or different questions as those previously answered incorrectly could again be displayed and answered. The workstation CPU could again check the answers and transmit the results to the teacher's station for storage. If all of the answers were correct, the student could access another lesson segment, request recreational material, or end for the day. If, however, after a predetermined number of tries the student still failed to grasp the material and answered some questions incorrectly, the student's workstation could send a message to the teacher's workstation indicating which material the student was having problems with. The teacher could then use his or her own methods to personally help the student grasp the material.

The enclosure 10 could also be used to effectively execute an assessment test on the students to carry out vocational, psychological, and intellectual testing and assessment. Many school systems require such testing to be carried out and evaluated by phsycologists which results in great deal of time and expense. These tests could be effectively implemented on software and loaded on the computer in each enclosure which would substantially reduce the time and expense of carrying out such tests.

The commercial use of the multi-functional enclosure in both the public and private sectors of our society can supply all communication requirements to conduct any and all manner of commercial activity needs. Anyone can, with proper identification, be able to purchase time on these enclosures and be automatically billed. These enclosures can be located in malls, banks, office buildings or any convenient location. They may also be purchased for home or private business use.

The security system is virtually foolproof and offers various levels of security depending on individual needs. The user would enter and use the communication services provided by the enclosure 10. One needs to possess a specially coded magnetic card much like a credit card. On this card is stored, in digital form, the individual's name, address, phone number, driver's license number, social security number, personal account number, digital voice graph, digital thumb print, physical description, and an encrypting code number. The card, when placed into the magnetic card port located on the door 12, would allow entry into the main operational area of the enclosure 10. Once inside the main operational area the card would be inserted into a card port located on the console to boot up the computer and engage all other communication equipment. The computer would ask the user to confirm certain data contained on his card by either using the keyboard or speaking. The console would include a thumb print scanner window to read the user's thumb print. If the person using the machine has found or stolen the card he could not match the voice print or the thumb print and therefore would be denied access to use the equipment. The enclosures 10 could be used as a "man-trap" and hold an offender for the authorities. The police would be notified instantly, electronically. The card, when used by the legitimate owner, would automatically bill that person's account for the time and services provided and print out a receipt for the same.

The enclosure 10 would have an inside overhead privacy screen that extended or retracted at the push of a button. The level of security chosen by the user to send or receive information could range from simply a name or account number to encrypting or decrypting the entire communication. Each level of security would require a higher usage fee. The monitor screen would give step by step written instructions for using each separate service, or it could give verbile commands.

Businesses could lease or buy these multi-functional enclosures 10. Each enclosure 10 can be customized to fit the customer's needs, including customizing software. Private schools, church schools, and home schools could own or lease a machine that would contain the equivalent of a standard twelve year educational program or beyond. The enclosure 10 can guarantee parody for all school children regardless of where their education was obtained.

It is to be understood that the present invention is not limited to the embodiments described above, but encompasses any and all embodiments within the scope of the following claims.

I claim:

1. A multi-function enclosure for students or businessmen which is responsive to a planar magnetic card having magnetic data disposed thereon comprising:

a housing having a front portion, a central portion and a rear portion;

a front cowling including latch means for providing access to a front storage area mounted on said front portion of said housing;

a curved door including latch means for providing access to a main operational area mounted on said central portion of said housing;

a rear lid including latch means for providing access to a rear storage area and a rear utility area mounted on said rear portion of said housing;

three magnetic card readers supported by said front cowling, said curved door, and said rear lid, said card readers responsive to the planar magnetic card having the magnetic data disposed thereon for reading the magnetic data and providing an output signal in response to the magnetic data on the planar card, said card readers each having a card input opening;

a preprogrammed computer system supported in said front storage area and including program means for communicating with a user and for receiving coded data contained on said planar magnetic card and for providing an output signal to said computer responsive to said data;

said latch means coupled to the output of said computer system for opening and locking said front storage area, said main operational area, said rear storage area, and said utility area in response to the output signal from said computer system;

an ergonomic seat or chair mounted in said main operational area of said housing; and a console mounted in said central portion of said housing including a fiber optic camera, a computer monitor, a computer printer, a modem coupled to said computer system, a facsimile machine coupled to said computer system, at least one floppy disc drive, at least one back-up tape drive, and a digital clock displaying day, date, and time.

2. The multi-functional enclosure according to claim 1, further including heating means, air conditioning means, and lighting means.

3. The multi-functional enclosure according to claim 2, wherein said main operational area of said housing includes control means for controlling said heating means, said air conditioning means, and said lighting means.

4. The multi-functional enclosure according to claim 1, wherein said ergonomic seat or chair includes means for tilting said seat or chair, and for dimensionally adjusting said chair up, down, forward, and backward.

5. The multi-functional enclosure according to claim 1, wherein said ergonomic seat includes two side extensions on either side of the top of said seat, and a stereophonic speaker housed in each side extension.

6. The multi-functional enclosure according to claim 1, wherein said ergonomic seat or chair includes arm rests that articulate and are adjustable.

7. The multi-functional enclosure according to claim 6, wherein said arm rests are concaved.

8. The multi-functional enclosure according to claim 6, wherein said ergonomic chair or seat includes a palm shaped disc approximately two inches thick mounted at the front of each arm rest and having five shallow grooves that correspond to digits of a hand for operating the computer system.

9. The multi-functional enclosure according to claim 1, including a split computer keyboard housed beneath said computer monitor and a small special function keypad that are movable forward to sit in front of each arm rest and is dimensionally adjustable for typing comfort.

10. The multi-functional enclosure according to claim 9, wherein said split computer keyboard includes keys having braille.

11. The multi-functional enclosure according to claim 1, wherein said main operational area includes passive, non-invasive monitors to record ambient temperature, heart rate, body temperature, breathing rate and stress levels of the users.

12. The multi-functional enclosure according to claim 1, wherein said housing is made from a combination of opaque, high-impact plastic and clear plexiglass.

13. A multi-function enclosure for students or businessmen which is responsive to a planar magnetic card having magnetic data disposed thereon comprising:

a housing having a front portion and a rear portion;

a front cowling including latch means for providing access to a front storage area mounted on said front portion of said housing;

a rear lid including latch means for providing access to a rear storage area and a rear utility area mounted on said rear portion of said housing;

three magnetic card readers supported by said front cowling, and said rear lid, said card readers responsive to the planar magnetic card having the magnetic data disposed thereon for reading the magnetic data and providing an output signal in response to the magnetic data on the planar card, said card readers each having a card input opening;

a preprogrammed computer system supported in said front storage area and including program means for communicating with a user and for receiving coded data contained on said planar magnetic card and for providing an output signal to said computer responsive to said data;

said latch means coupled to the output of said computer system for opening and locking said front storage area, said main operational area, said rear storage area, and said utility area in response to the output signal from said computer system; and a console mounted in a central portion of said housing including a fiber optic camera, a computer monitor, a computer printer, a modem coupled to said computer system, a facsimile machine coupled to said computer system, at least one floppy disc drive, at least one back-up tape drive, and a digital clock displaying day, date, and time;

wherein said rear portion is detachably connected to said front portion on rails to provide access to the interior of the enclosure by people in wheelchairs.

14. The multi-functional enclosure according to claim 13, including heating means, air conditioning means, and lighting means.

15. The multi-functional enclosure according to claim 14, wherein said main operational area of said housing includes control means for controlling said heating means, air conditioning means, and said lighting means.

16. The multi-functional enclosure according to claim 13, including a split computer keyboard housed beneath said computer monitor and a small special function keypad that are movable forward to sit in front of each arm rest and is dimensionally adjustable for typing comfort.

17. The multi-functional enclosure according to claim 16, wherein said split computer keyboard includes keys having braille.

18. The multi-functional enclosure according to claim 13, wherein the main operational area includes passive, noninvasive monitors to record ambient temperature, heart rate, body temperature, breathing rate and stress levels of the users.

19. The multi-functional enclosure according to claim 13, wherein said housing is made from a combination of opaque, high-impact plastic and clear plexiglass.

* * * * *